UNITED STATES PATENT OFFICE.

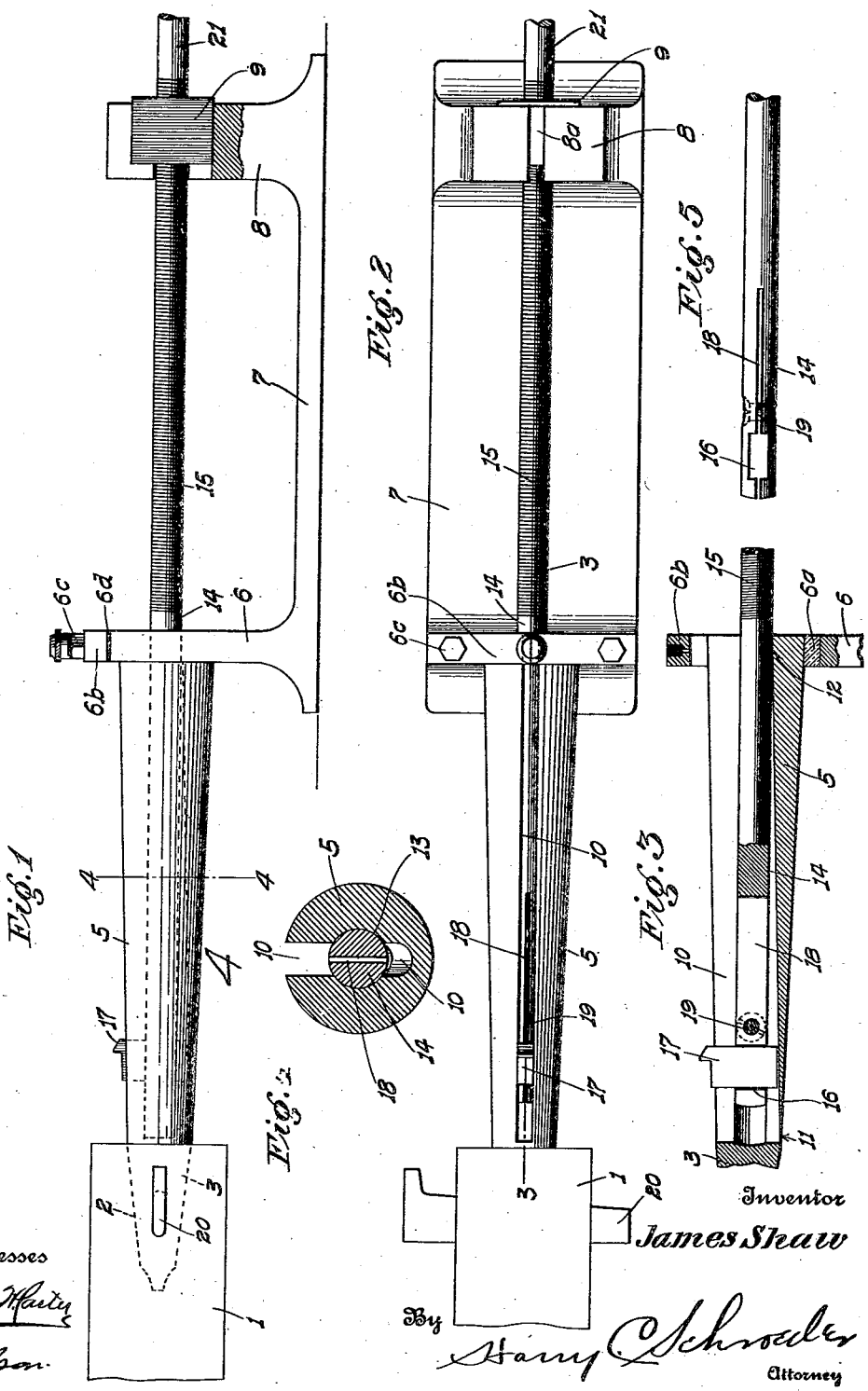

JAMES SHAW, OF ELK GROVE, CALIFORNIA.

TAPER-BORING TOOL.

1,123,145.            Specification of Letters Patent.       Patented Dec. 29, 1914.

Application filed March 6, 1913, Serial No. 752,379. Renewed May 19, 1914. Serial No. 839,645.

*To all whom it may concern:*

Be it known that I, JAMES SHAW, a citizen of the United States, residing at Elk Grove, in the county of Sacramento and State of California, have invented certain new and useful Improvements in Taper-Boring Tools, of which the following is a specification.

This invention relates to improvements in lathe tools, and particularly to a tool for finishing tapered holes in metal castings, the object of this invention being to provide a tool, whereby such a hole, having once been cored to a semblance of its shape, may be quickly and accurately finished to any degree of fineness desired. Also a tool which is simple in construction and operation, and which may be adapted for use with any standard lathe or boring mill. These objects I accomplish by means of the peculiar construction and adaptation of parts as described herein, and shown in the accompanying drawings, in which:

Figure 1 is a side elevation of my improved tool as applied to a lathe. Fig. 2 is a top plan view of the same. Fig. 3 is a sectional view on a line 3—3 of Fig. 2. Fig. 4 is a sectional view on a line 4—4 of Fig. 1. Fig. 5 is a fragmentary top plan view of a tool-holder.

In the drawings the same numerals indicate corresponding parts in the several views, in which:

1 represents the end of a lathe spindle, or boring bar, fitted with the usual taper hole 2 for the reception of the corresponding end 3 of a taper boring tool 4, such tool being further provided with a main body portion 5, tapering outwardly along its length, said taper being of the same degree and angle as that of the hole to be finished, the large end of the same turning in a bearing 6 in a frame member 7 of any desired shape and length, the farther end of said frame terminating in a bearing support 8 having a bearing block 9 set therein for a purpose as will appear.

The bearing member 6 is provided with split bushings 6ª, held in position by any suitable means, which may be removed if desired for the insertion of a bushing to take a larger or smaller tool member 5 than that shown. A strip 6ᵇ secured across the top of said bearing member 6 by means of bolts 6ᶜ, holds said bushings down in place. Should a larger bushing be used, liners 6ᵈ may be inserted between members 6 and 6ᵇ to take up the space caused by the insertion of said larger bushing. Running lengthwise of said body 5 is cut a groove or slot 10, said groove extending considerably below the center of said body 5 at its inception, as at 11, and running thence upward toward the center, in a line parallel to the edge of said body 5 from which said slot is cut, as at 12. Through the center of said body 5 is bored a circular hole 13, in which is adapted to slide a shaft 14, said shaft being considerably longer than said body portion, having threads 15 cut on its outer end for a considerable distance, adapted to engage with similar threads cut in the bearing block 9, said block being square or rectangular and being slidably removable from member 8 in the outer direction.

In one end of shaft 14 is cut a slot 16 extending diametrically therethrough, being of the same width as slot 10 in member 5, and of sufficient length to receive a cutting tool 17, said cutting tool being of any desired shape and formed of any standard tool steel such as is used for that purpose. A slit 18 is also diametrically cut through said shaft from the end, to and beyond slot 16, a countersunk screw 19 joining both halves of said split portion and adapted to tighten up on said tool 17. A cotter pin 20 holds the end 3 of tool 4 in fixed relation with spindle 1 and prevents possible outward movement of the same. Should it be so desired, the shaft 14 may be extended beyond the threaded portion 15, as at 21, for an equal distance similar to the first portion thereof, and have a similar slot 16 cut therein also, for the purpose as will appear. A groove 8ª may also be cut through the top of bearing member 8 down to the block 9, and being wide enough to admit of the passage of the tool member 17 therethrough. The distance between bearing members 6 and 8 is about equal to the length of the body member 5, which is the length of the working stroke of the tool.

In order to keep grit and chippings of metal from falling into groove 10 while the device is in operation, a piece of wood well greased and adapted to slide in and fit into said groove, and extending from the tool 17 to the end of said groove, may be inserted therein, the tool 17 pushing the said piece of wood out as it progresses, the wood, by thus filling the slot in front of the tool, prevents any chips from clogging up said groove, and interfering with the free movement of the tool.

The operation is as follows: The casting to be bored is clamped to the lathe in the usual manner so that the hole to be finished is centrally located with regard to the spindle of the lathe, the small end of said hole being nearest said spindle. The body member 5 of the tool 4, of a taper corresponding to that desired in the hole to be finished, is then inserted into the hole, and the end 3 is wedged and pinned into socket 2 in spindle 1, the cutting tool being at the beginning of the stroke, as shown in the drawings. The shaft 14 may then be removed by backing the block 9 out from bearing 8, and a cutting tool of a desired length inserted into slot 16 and made fast therein, shaft 14 then being slid back into place, the frame 7 clamped down to the lathe by any suitable means, and the device is in a position to operate. Now it will be clear that as soon as power is applied to spindle 1, body member 5 is caused to turn, taking with it tool 17 in slot 10 which in turn causes shaft 14 to turn also. This shaft, being threaded into the block 9, which cannot turn, is thus gradually drawn through said block, pulling with it tool 17, which, guided by tapered slot 10, is cutting in a circle, and at the same time increasing its radius of cutting until the limit is reached at bearing 6. Should another cut be desired, a slightly longer tool 17 is inserted, and the operation repeated. It will be noticed however, that after a cut has been made to the limit of the stroke, the threaded portion of the shaft 14 has turned through the block 9, and it would be necessary to reverse the direction of motion of the lathe in order to bring shaft 14 back to its starting position as shown in Fig. 1. In order to do away with this inconvenience the shaft 14 may be made double ended, as hereinbefore described, so that all that it is necessary to do is to pull out shaft 14 and block 9, reverse same, and insert the other end 21, which will then be at the beginning of another stroke, ready for another cut, and so on indefinitely.

Thus it will be seen that I have substantially fulfilled the objects of my invention as set forth herein. While this sets forth the present and preferred embodiment of my invention, still in practice such deviations from such detail may be made as do not depart from the scope of the claims.

Having thus described my invention, what I claim as new and useful, and desire to secure by Letters Patent is:—

1. In a device of the kind described, a body member adapted to be secured at one end to the spindle of a lathe, a cutting tool mounted in said body member and adapted to slide therein, means whereby said tool is propelled forward at a uniform speed, and means for holding said body member and said propelling means stationary with respect to said lathe, as set forth.

2. In a taper boring device, a cylindrically tapering body member, a cutting tool slidably mounted in said body member, and adapted to rotate with the same, a shaft member running lengthwise through said body member and adapted to receive and hold said cutting tool at one end, a fixed block adapted to receive therein a threaded portion, a threaded portion on the outer end of said shaft member, said threaded portion passing through said fixed block, and means for holding said block and said body member in fixed relation with each other, as set forth.

3. In a taper boring device, a frame, a raised journal box carried at one end of the said frame, a removable bushing suitably mounted in said journal box, a cylindrical tapered body member centrally bored and having therein a groove extending longitudinally of said bore and parallel with the opposite external taper surface, and also having a slot opposite to said groove and extending longitudinally of said bore and communicating therewith, said cylindrical tapered body having one end thereof disposed in said removable bushing, a raised portion carried by the said frame and located opposite to the said journal box, a threaded box mounted in the said raised portion, a cutting tool adapted to slide in said groove and slot, a shaft disposed in the said bore of the tapered body member and adapted to engage the said cutting tool and move it longitudinally of said bore, a threaded portion carried by the said shaft and adapted to work in the said threaded box, and means whereby said body member may be secured to a lathe spindle, as and for the purpose set forth.

4. In a taper boring attachment for lathes, a frame adapted to be secured to said lathe, a taper-cutting tool member rotatably mounted in said frame and secured to the spindle of said lathe and being between the two, and means whereby tool members of different sizes may be mounted in said frame, as set forth.

In testimony whereof, I affix my signature in presence of two witnesses.

JAMES SHAW.

Witnesses:
FRANK H. CARTER,
W. A. STOCK.